United States Patent Office 3,325,501
Patented June 13, 1967

3,325,501
9-[PIPERIDYLIDENE(4')]-1-AZA-THIAXANTHENE-10-OXIDES AND DERIVATIVES
Ernst Jucker, Ettingen, Anton Ebnöther, Reinach, Basel-Land, and Erwin Rissi, Basel, Switzerland, assignors to Sandoz Ltd. (also known as Sandoz A.G.), Basel, Switzerland
No Drawing. Filed Feb. 18, 1964, Ser. No. 345,599
4 Claims. (Cl. 260—293.4)

The present invention relates to new 1-aza-thiaxanthene derivatives, acid addition salts thereof and pharmaceutical compositions containing the same.

The present invention provides compounds of the formula:

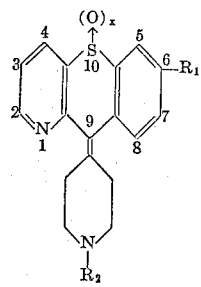

wherein $R_1$ is a member selected from the group consisting of hydrogen and halogen, $R_2$ is lower alkyl, $x$ is an integer selected from the group consisting of 1 and 2, their acid addition salts with organic and inorganic acids and pharmaceutical compositions comprising, in addition to an inert carrier, a said compound and/or its acid addition salts in a therapeutically effective amount.

The 1-aza-thiaxanthene derivatives of the Formula I are obtained by oxidizing a 1-aza-thiaxanthene derivative of the formula:

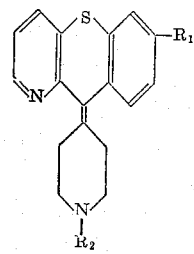

wherein $R_1$ and $R_2$ have the above significance, and, when an acid addition salt is required, reacting the resulting compound with an organic or inorganic acid.

Examples of suitable values for $R_1$ are hydrogen, chlorine or bromine atoms and for $R_2$ methyl, ethyl, propyl, isopropyl or butyl radicals.

Oxidation of the sulphur atom in the process of the invention may advantageously be effected with a suitable oxidising agent, e.g. hydrogen peroxide, an organic peracid or a salt thereof, e.g. an alkali metal metaperiodate which is especially suitable for use in the process of the invention.

One method of effecting the process of the invention is, for example, as follows:

When a compound I, in which $x$ signifies 1, is required, it may be obtained by adding the calculated quantity of a dilute aqueous sodium metaperiodate solution to a solution in acetic acid of a compound II, e.g. 9-[1'-methyl-piperidylidene-(4)]-1-aza-thiaxanthene, over a period of 3 to 5 hours at room temperature. To complete the reaction the mixture is left to stand for 3 days at room temperature. After removing precipitated sodium iodate and after making alkaline with ammonia or an alkali metal hydroxide, the resulting compound I is extracted with an inert organic solvent, preferably methylene chloride, the solvent is removed in known manner, compound I purified and, if desired, converted into an acid addition salt. Likewise the oxidation may be effected, at room temperature or higher, with an organic peracid, e.g. perbenzoic acid, or with hydrogen peroxide, instead of the above mentioned aqueous sodium metaperiodate solution.

When a compound I, in which $x$ signifies 2, is required, it may, for example, be obtained by treating at room temperature or higher, with hydrogen peroxide a compound II in glacial acetic acid to which there had been added a catalytical quantity of a strong mineral acid, e.g. concentrated sulphuric acid. After a reaction period of several hours the mixture is reduced in volume, the residue taken up in water, ammonia or a caustic alkali solution is added until an alkaline reaction is obtained, the precipitated base taken up in an inert organic solvent, preferably methylene chloride, washed with water and the solvent evaporated. The base may be crystallized as such and/or converted into an acid addition salt with an organic or inorganic acid.

The compounds I are basic compounds which are cystalline at room temperature; with organic and inorganic acids they form relatively stable, crystalline salts. Examples of acids for acid addition salt formation are hydrochloric, hydrobromic, sulphuric, fumaric, maleic, malic, acetic and tartaric acid.

These compounds II in which $R_1$ signifies a halogen atom and $R_2$ signifies a lower alkyl radical are new and therefore included in the present invention; they may be produced by reacting a 6-halogeno-1-aza-thiaxanthone with a 1-alkyl $(C_1-C_4)$-4-halogeno-piperidine according to Grignard, hydrolyzing the reaction product to give a 6-halogeno-9-[1' - alkyl $(C_1–C_4)$ - piperidyl-(4')]-1-aza-thiaxanthydrol and subsequently treating this with an agent for splitting off water.

The compounds of Formula I have therapeutically useful pharmacodynamic properties, e.g. marked and specific histamine inhibiting or antiallergic effect, antichlorinergic properties, a particularly marked broncholytic effect which is not due to a sympathicomimetic effect, as is the case with known broncholytics and antiasthmatics, and a cought inhibiting effect. Undesired side effects, e.g. a sedative effect possessed by known antihistaminics or antiallergics, are reduced to a minimum in the compounds I. For this reason the compounds I are indicated for use as antihistaminics, antiallergics, antiasthmatics and antitussives, e.g. in the case of rhinitis allergica, asthma bronchiale, status asthmaticus or bronchitis. A further or alternative suggested use, in view of the anticholinergic property, is the treatment of vagotonic disorders, or as spasmolytics.

The present invention further provides pharmaceutical compositions containing, in addition to a physiologically acceptable inert carrier, a compound I above and/or an acid addition salt thereof.

The compounds of the present invention are combined with physiologically acceptable, non-toxic, inert carriers for the purpose of making them suitable for administration, e.g. enterally or parenterally. In order to produce such medicinal preparations, the compounds of the invention are worked up with inorganic or organic adjuvants which are physiologically acceptable. Examples of such adjuvants are as follows:

Tablets and dragees: Lactose, starch, talc and stearic acid.

Injectable solutions: Water, alcohols, glycerin and plant oils.

Suppositories: Natural or hardened oils and waxes.

The above preparations may also contain suitable preserving, stabilizing or wetting agents, solubilizers, sweetening and colouring substances or flavourings.

In the following non-limitative examples all temperatures are indicate in degrees centigrade and are uncorrected.

*Example 1.—9-[1'-methyl-piperidylidene-(4')]-1-aza-thiaxanthene-10-oxide*

45 cc. of a 0.5 molar sodium periodate solution are added dropwise to a solution of 5.88 g. of 9-[1'-methyl-piperidylidene - (4')]-1-aza-thiaxanthene (melting point 154–156° from acetone) in 200 cc. of water and 1.2 cc. of glacial acetic acid, whilst stirring well for 4 hours and subsequently the mixture is stirred for 3 days at room temperature. Thereupon the precipitated sodium iodate is filtered off, the filtrate is made alkaline with caustic potash solution and extracted a number of times with methylene chloride. After drying the combined extracts over magnesium sulphate and removing the solvent by evaporation, the residue is dissolved in acetone, whereupon the 9 [1' - methyl - piperidylidene-(4')]-1-aza-thiaxanthene-10-oxide crystallizes. After recrystallizing twice from acetone it melts at 146–147°.

*Example 2.—6-chloro-9-[1'-methyl-piperidylidene-(4')]-1-aza-thiaxanthene-10-oxide*

A solution of 2.03 g. of sodium metaperiodate in 20 cc. of water is added to a solution of 2.7 g. of 6-chloro-9-[1'-methyl-piperidylidene-(4')]-1-aza-thiaxanthene in 40 cc. of water and 0.56 cc. of glacial acetic acid whilst stirring well at room temperature during the course of 75 minutes. After stirring for 128 hours at room temperature and for 4 hours at 50° the reaction mixture is made alkaline with concentrated ammonium hydroxide solution and extracted a number of times with methylene chloride. After drying the combined extracts over sodium sulphate and evaporating the solvent, the residue is recrystallized twice from ethanol/acetone (approximately 1:2). 6-chloro-9-[1' - methyl - piperidylene - (4')]-1-aza-thiaxanthene-10-oxide melts at 178–180° with slight decomposition.

The 6 - chloro-9-[1'-methyl-piperidylidene-(4')]-1-aza-thiaxanthene used as starting material is produced as follows: 2.43 g. of magnesium shavings which have been activated with iodine are covered with a layer of 10 cc. of absolute tetrahydrofuran and 0.2 cc. of ethylene bromide is added. As soon as the reaction commences a solution of 14.7 g. of 1-methyl-4-chloropiperidine in 25 cc. of absolute tetrahydrofuran is added dropwise whereby the reaction mixture boils continually. Subsequently heating is effected for a further 2 hours at reflux until the major portion of magnesium has dissolved. After cooling to 20°, 12.4 g. of finely ground 6-chloro-1-aza-thiaxanthone are added portionwise to the mixture and stirring is effected for a further 30 minutes at room temperature. The reaction mixture is then poured into 300 cc. of a 10% ammonium chloride solution and extracted three times with methylene chloride. The combined extracts which have been dried over potassium carbonate are evaporated and the residue is dissolved in acetone, from which the 6-chloro - 9-[1'-methyl-piperidyl-(4')]-1-aza-thiazanthydrol crytsallizes. Melting point 166–167° after recrystallizing twice from ethanol.

3.75 g. of the resulting compound are heated to 140° together with a mixture of 22.5 cc. of concentrated sulphuric acid and 7.5 cc. of water for 15 minutes. Subsequently the reaction mixture is poured into ice water and the solution which has been made alkaline with sodium hydroxide solution is extracted with methylene chloride. After drying the methylene chloride extract over potassium carbonate and removing the solvent by evaporation, the residue is crystallized from acetone. 6-chloro-9-[1'-methyl-piperidylidene-(4')]-1-aza-thiaxanthene melts at 110–112°.

*Example 3.—9-[1'-methyl-piperidylidene-(4')]-1-aza-thiaxanthene-10,10-dioxide*

A mixture of 9.5 g. of 9-[1'-methyl-piperidylidene-(4')]-1-aza-thiaxanthene (melting point 154–156° after sintering from 152°), 140 cc. of glacial acetic acid and 38 cc. of concentrated sulphuric acid is heated to 60° and a solution of 17.1 cc. of 38.5% aqueous hydrogen peroxide solution in 17 cc. of glacial acetic acid is added dropwise whilst stirring. After stirring for 16 hours at 60° the reaction mixture is concentrated at a pressure of 15 mm. Hg. Subsequently the residue is dissolved in water, the aqueous solution is made alkaline with concentrated ammonium hydroxide solution and extracted a number of times with methylene chloride. The combined extracts are washed with water until neutral, dried over sodium sulphate and evaporated to dryness at a pressure of 15 mm. Hg. After recrystallizing twice from methanol 9-[1'-methyl - piperidylidene-(4')]-1-aza-thiaxanthene-10,10-dioxide melts at 188–189° (decomposition).

What is claimed is:

1. A 1-aza-thiaxanthene derivative of the formula:

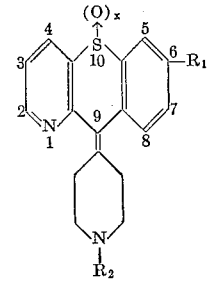

wherein $R_1$ is a member selected from the group consisting of hydrogen and halogen, $R_2$ is lower alkyl, $x$ is an integer selected from the group consisting of 1 and 2, and acid addition salts thereof with an acid selected from the group consisting of hydrochloric acid, hydrobromic acid, sulfuric acid, fumaric acid, maleic acid, malic acid, acetic acid and tartaric acid.

2. 9 - [1' - methyl - piperidylidene-(4')]-1-aza-thiaxanthene-10-oxide.

3. 6 - chloro - 9 - [1'-methyl-piperidylidene-(4')]-1-aza-thiaxanthene-10-oxide.

4. 9 - [1' - methyl - piperidylidene - (9)]-1-aza-thiaxanthene-10,10-dioxide.

References Cited

UNITED STATES PATENTS

| | | | |
|---|---|---|---|
| 2,629,719 | 2/1953 | Cusic | 260—293.44 |
| 3,055,903 | 9/1962 | Renz et al. | 260—293.44 |
| 3,086,972 | 4/1963 | Jucker et al. | 260—240 |

OTHER REFERENCES

Bibliographia, Sandoz Tabulae E #2 (December 1962).

WALTER A. MODANCE, *Primary Examiner.*

AVROM D. SPEVACK, *Assistant Examiner.*